United States Patent [19]
Vanice

[11] 3,915,469
[45] Oct. 28, 1975

[54] LOCKING DEVICE FOR SECURING A PIVOT PIN IN A BORE

[75] Inventor: Larry L. Vanice, Fort Wayne, Ind.

[73] Assignee: International Harvester Company, Chicago, Ill.

[22] Filed: Nov. 11, 1974

[21] Appl. No.: 522,806

[52] U.S. Cl. .............. 280/96.1; 151/26; 403/154
[51] Int. Cl.² ............................................ B62D 7/18
[58] Field of Search ............ 280/96.1, 96.3; 151/26, 151/25 R; 403/154, 156, 378, 379

[56] References Cited
UNITED STATES PATENTS

| | | | |
|---|---|---|---|
| 1,033,411 | 7/1912 | Jones | 151/26 |
| 2,208,189 | 7/1940 | Jones | 280/96.1 |
| 2,916,295 | 12/1959 | Sandberg | 280/96.1 |
| 2,941,812 | 6/1960 | Reynolds | 151/26 X |
| 3,441,288 | 4/1969 | Boughner | 280/96.1 |

Primary Examiner—Kenneth H. Betts
Attorney, Agent, or Firm—Raymond E. Parks; Floyd B. Harman

[57] ABSTRACT

A bolt having a deformable head and a deformable tube are used to secure a pivot pin or kingpin in a bore against rotation and axial shifting without having to notch or otherwise keyway the pivot pin for the bolt.

4 Claims, 3 Drawing Figures

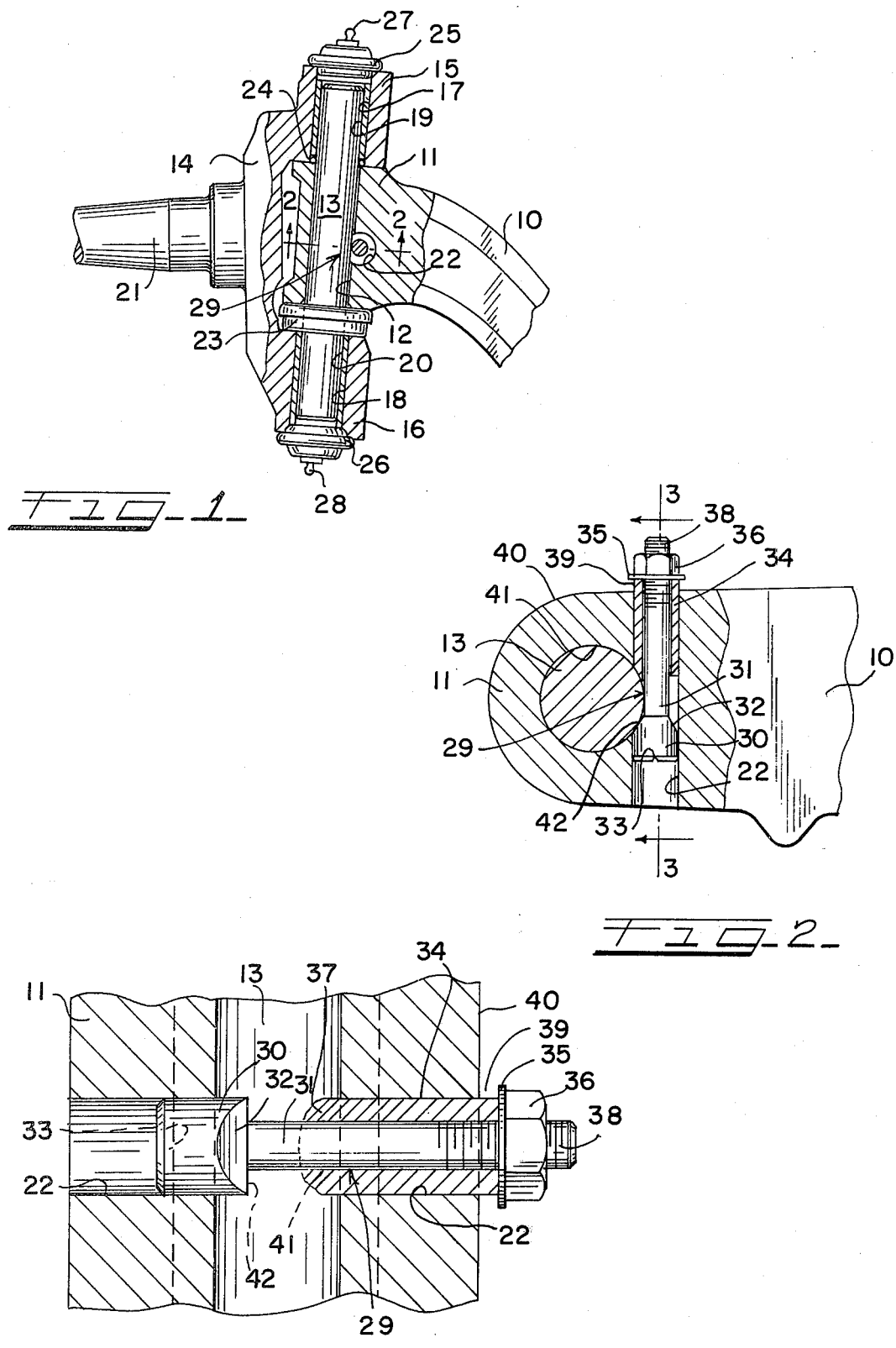

LOCKING DEVICE FOR SECURING A PIVOT PIN IN A BORE

FIELD OF THE INVENTION

In steering wheel assemblies which are mounted on the outboard ends of an elongate beam type axle, a steering knuckle is pivotally mounted on a pivot pin or kingpin carried in an apertured boss at each end of the axle. The pivot pin is usually secured in the bore of the boss by a transversely extending key or pin which secures the kingpin in the bore against rotation and axial shifting. This invention is directed to an improvement of the pin or securing means for locking the pivot pin in the bore.

DESCRIPTION OF THE PRIOR ART

In the U.S. Pat. No. 1,446,240 — Zimmerman — Feb. 20, 1923, a pivot pin or kingpin is notched in the middle in the form of an axially extending inclined surface, merging into a shoulder which engages with a transverse draw pin carried in an aperture in the axle boss. In the U.S. Pat. No. 1,652,780 — Goode — Dec. 13, 1927, U.S. Pat. No. 1,697,784 — Seaholm — Jan. 1, 1929 and U.S. Pat. No. 3,479,051 — Weiss — Nov. 18, 1969, the kingpin is grooved in the middle in the form of a U-shaped channel and engages with a transverse pin of either circular or semi-circular cross section. In U.S. Pat. No. 2,512,881 — Smiley — June 27, 1950, U.S. Pat. No. 3,294,413 — Jurosek et al. — Dec. 27, 1966 and U.S. Pat. No. 3,441,288 — Boughner — Apr. 29, 1969, the pivot pin or kingpin is grooved in the middle in the form of a semi-circular recess and engages with a transverse pin of circular cross section. And, in U.S. Pat. No. 2,916,295 — Sandberg — Dec. 8, 1959 the kingpin is notched in the middle and engages with a transverse pin having a tooth corresponding in shape to the notch in the kingpin. The transverse pin further being frusto-conical in shape so that axially tightening the pin in the transverse hole wedges the tooth into the notch of the kingpin.

SUMMARY OF THE INVENTION

According to the invention there is provided a beam type axle which is symmetrical and has a cylindrical boss at the terminal ends thereof. Each boss has a bore extending obliquely upwards, and a pivot pin or kingpin is pressed in the bore with the ends thereof extending above and below the boss. A pair of steering knuckles each having a yoke portion comprising upper and lower arms having axially aligned apertures, are pivotally mounted on the extending ends of the pins. Bearings are provided for the extending ends of the pivot pins in the apertures in the arms. A pair of thrust bearing and seal assemblies are provided between the bottom of each boss and the top of each lower arm. A pair of lip-type seals or O rings are provided between the top of each boss and the bottom portion of each upper arm and the outboard ends of the apertures are closed by caps. Each boss is provided with a transverse hole which intersects with the kingpin bore. The diameter of the hole is of a size to fit the head of a bolt which is inserted in one end of the hole. The head of the bolt is provided with diametrically opposite flats which extend obliquely axially from the shank portion of the bolt. A tube is sleeved over the threaded end of the bolt into the other end of the hole. A washer and a nut is placed on the threaded end of the bolt; and the nut is torqued until the flat portion of the bolt and the inward end of the tube each engage the pivot pin or kingpin and are deformed by the pressure of continued torquing to an extent that the pivot pin is prevented from rotating about its axis and shifting axially along the length of the bore. The object of the invention is to secure the pivot pin in the bore without having to provide a notch or other form of keyway in the pivot pin for the transverse securing pin means.

DESCRIPTION OF THE DRAWING

FIG. 1 shows one side of an axle and a steering knuckle, with parts broken away, hinged to a pivot pin carried in a bore of a boss on the outboard end of the axle;

FIG. 2 is a section taken on line 2,2 of FIG. 1; and

FIG. 3 is a section taken on line 3,3 of FIG. 2.

DESCRIPTION OF THE PREFERRED EMBODIMENT

With reference to the figures of the drawing a partial segment of a wheel axle is shown at 10. The axle is symmetrical and accordingly the foregoing description relating to one end of the axle applies equally to the opposite end of the axle, not shown. On the outboard end of the axle there is a boss 11 having a bore 12. The axis of the bore 12 extends upwardly on an inclined plane to the vertical, when the axle 10 is in its normal horizontal position. A steering pivot pin or kingpin 13 is pressed in close sliding fit into the bore 12 and has ends projecting above and below the boss 11. Pivotally mounted on the projecting extremities of the pivot pin 13 is a knuckle member 14 which has a bifurcated or yoke portion comprising upper and lower arms 15 and 16. The arms or flanges have axially aligned apertures 17 and 18 which receive plain bearings 19 and 20. The bearings are sleeved over the projecting extremities of the kingpin and provide a steering axis for a wheel, such as is shown in U.S. Pat. No. 1,637,089 — Perro — July 26, 1927. The wheel, (not shown) is mounted rotatably on the spindle portion 21 of the knuckle member 14. A hole 22 is provided in the boss 11 on an axis which is transverse to the axis of the bore 12, and intersects the bore 12 at a location approximate midway the length of the boss 11, such as is shown in U.S. Pat. No. 2,432,708 — Ash — Dec. 16, 1947. An integral thrust bearing and seal assembly 23 is positioned about the kingpin 14 and is interposed between the bottom of the boss 11 and the top portion of the lower arm 16 of the knuckle member. A lip-type seal or an O ring 24 is positioned at the lower portion of the upper arm 17 and the top of the boss 11 and seals the opening between the bore 12 and the upwardly projecting extremity of the kingpin. The outboard ends of the upper and lower apertures 17 and 18 are sealed by any suitable end enclosure means such as caps 25 and 26. Suitable lubrication admitting means, such as fittings 27 and 28 may be provided in the caps or in the boss for lubricating the upper and lower bearings 19 and 20. The pivot pin is secured in the bore by the novel securing pin means which will now be described.

There is provided a bolt 29 having a cylindrical head portion 30 and an elongated shank portion 31 terminating in a threaded end portion 32. The head 30 of the bolt 29 has at least one flat or may have a pair of diametrically opposite flats 32 that project obliquely axially or upwardly and rearwardly from the shank 31. An indicia such as a notch 33 may be provided in the top of the head portion to indicate tangency of the one engaging flat with the pivot pin or the parallel alignment of this flat, with the longitudinal axis of the pivot pin. A tube 34 is sleeved over the threaded end of the bolt 29 and has an edge, which is chamfered or otherwise profiled, on the inboard end, a portion of which, engages with the pivot pin 13 arcuately spaced from the one engaging flat 32 on the bolt head 30. A washer 35 and a nut 36 are screwed on the threaded end of the bolt.

Clearance 39 is provided between the washer 35 and the edge 40 of the boss 11 so that there is sufficient axial space to permit the nut 36 to axially jam the engaging flat 32 and the engaging chamfered portion of the tube 34 into two arcuately spaced apart portions 41 and 42 on the circumferential surface of the pivot pin 13. The nut 36 is then drawn tight against the protruding outboard end of the tube forcing the inboard end of the tube and the one flat 32 into firm engagement with the kingpin 13. Continued torquing of the nut 36 against the washer 35 wedges the one flat 32 on the bolt head 30, as well as the contacting chamfered portion of the tube 34 against the kingpin 13. The torquing continues to a predetermined pressure where the pressure causes the wedged flat and tube edge to deform against the arcuate surface of the kingpin. The deformation together with the force of the tightened nut 36 locks the kingpin 13 in the bore 12 and prevents rotation and axial shifting of the kingpin. An exaggerated deformed portion 37 on the tube 34 is shown in FIG. 3. The deformations of the bolt 29 and tube 34 are possible due to the softness of the material of these parts as compared to the hardness of the material of the pivot pin 13.

It is to be noted that the hole 22 and the bolt head 30 are of circular cross-section in the preferred embodiment. However, any form of opening and any shape of bolt head may be used in practice of the invention. The bolt head 30 may be of a shape other than that of the hole 22, e.g., such as a hexagon or square head bolt in round hole, and, the head of the bolt may be provided with a chamfered edge at the start of the shank in place of the flat 32.

The embodiments of the invention in which an exclusive property or privilege is claimed are defined as follows:

1. In a steering axle assembly having a beam type axle, a boss having a bore therethrough at the outboard ends of the axle, a pivot pin in each bore, a bifurcated steering knuckle journally mounted on each pivot pin, each boss having a straight hole extending therethrough transversely to and intersecting with the bore, and a pin means in each hole for holding the pivot pins in the bores against rotation and axial shifting, wherein the improvement comprising:

the pin means being a bolt having a head portion of a cross sectional size that is fully insertable in one end of the hole and being inserted in the hole, a shank portion extending from the head portion and merging into a threaded end portion extending from the boss at the opposite end of the hole, the head portion having a wedge-like axially extending flat surface positioned tangentially against the circumferential surface of the pivot pin;

a tube inserted in the opposite end of the hole and being sleeved over the threaded end portion of the bolt, the tube having a chamfered inboard end, a portion of which tangentially engaging the circumferential surface of the pivot pin and being arcuately spaced from the tangential engagement of the flat surface of the head portion, the tube having an outboard end portion protruding from the boss at the opposite end of the hole;

a washer sleeved over the threaded end portion of the bolt against the outboard end of the tube;

and a nut torqued over the threaded end portion against the washer, the pressure of the torquing being a determined amount for causing the tangentially engaging flat surface of the bolt and the tangentially engaging portion of the inboard end of the tube to deform against the circumferential surface of the pivot pin and secure the pivot pin in the bore.

2. In a steering axle assembly as claimed in claim 1 wherein the hole is circular in cross section, and the head portion of the pin means is cylindrical, and the flat surface is provided on diametrical opposite sides of the head portion, and the top of the head portion has an indicia means for positioning one of the flat surfaces tangentially against the circumferential surface of the pivot pin.

3. In a steering axle assembly as claimed in claim 1 wherein the head of the bolt and the tube each being made from material softer than that of the pivot pin.

4. In a steering axle assembly as claimed in claim 2 wherein the head of the bolt and the tube each being made from material softer than that of the pivot pin.

* * * * *